Aug. 12, 1924.  M. ROCKSTROH  1,504,979
STIFFENING OF PRINTING PRESSES
Filed Oct. 12, 1920
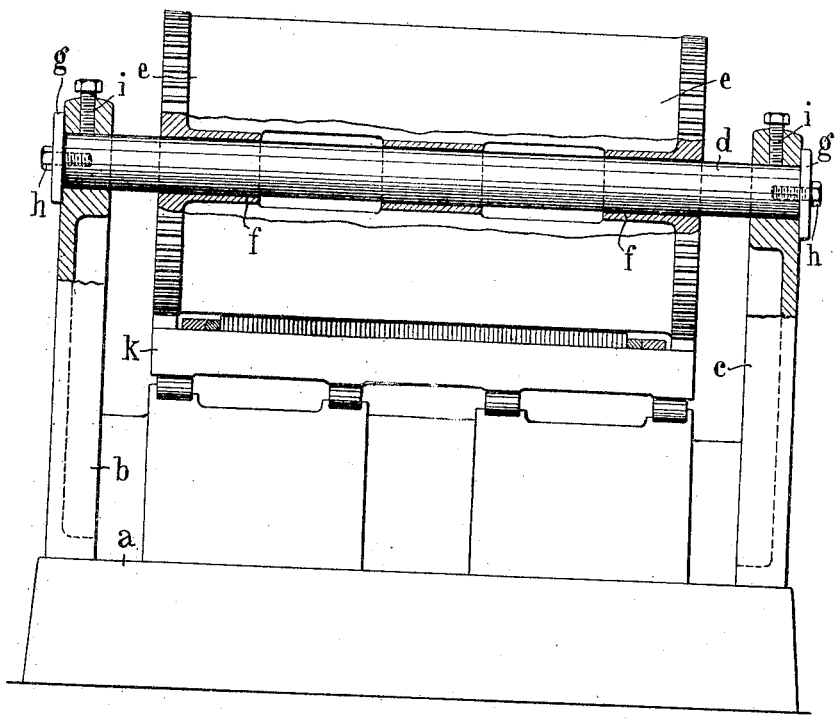

Patented Aug. 12, 1924.

1,504,979

UNITED STATES PATENT OFFICE.

MAX ROCKSTROH, OF KLEIN SEDLITZ, NEAR PIRNA, GERMANY.

STIFFENING OF PRINTING PRESSES.

Application filed October 12, 1920. Serial No. 416,585.

(GRANTED UNDER THE PROVISIONS OF THE ACT OF MARCH 3, 1921, 41 STAT. L., 1313.)

*To all whom it may concern:*

Be it known that I, MAX ROCKSTROH, manufacturer, a citizen of the German Republic, residing at Klein Sedlitz, near Pirna, Saxony, Germany, have invented certain new and useful Improvements in the Stiffening of Printing Presses (for which I have filed applications in Germany on March 6, 1918, Patent No. 345,870; in Austria on March 20, 1918; in Hungary on March 18, 1918; in Switzerland on March 21, 1918, Patent No. 79,772; in Denmark on March 22, 1918; in Italy on April 10, 1918; in Great Britain on April 6, 1918, Patent No. 117,591; and in France on May 22, 1918, Patent No. 516,440), of which the following is a specification.

Almost all printing presses have the defect, that under great strains the side frames bow out sideways at the cylinder-bearings and become elastic. Even when the side frames are gripped by the underframe to the highest permissible limit the spread of the side frames cannot be wholly avoided.

The object of the invention is to overcome this difficulty, which object is attained by connecting the side frames together in the locality of the bearings of the pressure cylinder. This connection can, for instance, be effected by rigidly mounting the axle of the printing cylinder in the side frames so as to serve as a stiffener, the pressure cylinder at the same time running on said axle, or rigidly mounting the pressure cylinder on a revolving axle which has a longitudinal bore to receive the cross-brace serving for the connection of the side frames.

The invention is illustrated in the annexed drawing and shows in the single figure one form of execution in vertical section.

Referring to the figure, the side frames $b$ and $c$ are fixed on the base $a$. $d$ is the axle of the pressure cylinder $e$, which is arranged thereon by means of the sleeve $f$ revolving on $d$. The axle $d$ with its ends passes through the cheeks of the side frames $b$ and $c$ and is rigidly connected with the side frames by means of the end-plates $g$ and the screw-bolts $h$, which are screwed into the main ends, so that the side frames cannot spring out laterally. The grub screws $i$ serve to prevent the rotation of the axle $d$. $k$ is the base for the printing frame.

Having now particularly described and ascertained the nature of my said invention and in what manner the same is to be performed, I declare that what I claim is:—

1. In a printing press, a base, side frames carried by and extending upwardly from said base, said side frames each having an aperture adjacent its upper end, an axle extending through said apertures, each end of said axle having means associated therewith and engaging the outer side of one of said frames to prevent said frames from spreading, each of said frames having means associated therewith and engaging said axle to secure said axle against rotation, and a pressure cylinder rotatably mounted on said axle.

2. In a printing press, a base, side frames extending upwardly from said base and having bearings therein, an axle having its ends resting in said bearings, set screws for preventing rotation of said axle, end plates for preventing longitudinal movement of said axle relative to the side frames, and a pressure cylinder rotatably mounted on said axle.

In testimony whereof I have hereunto set my hand in presence of two subscribing witnesses.

MAX ROCKSTROH.

Witnesses:
　WALDEMAR DÖRING,
　KARL WEBER.